United States Patent
Pan

(10) Patent No.: US 8,055,124 B2
(45) Date of Patent: Nov. 8, 2011

(54) SYSTEM FOR CONTROLLING ROTARY SPEED OF COMPUTER FAN

(75) Inventor: Ai-Yu Pan, Shenzhen (CN)

(73) Assignees: Hong Fu Jin Precision Industry (ShenZhen) Co., Ltd., Shenzhen, Guangdong Province (CN); Hon Hai Precision Industry Co., Ltd., Tu-Cheng, New Taipei (TW)

( * ) Notice: Subject to any disclaimer, the term of this patent is extended or adjusted under 35 U.S.C. 154(b) by 273 days.

(21) Appl. No.: 12/545,088

(22) Filed: Aug. 21, 2009

(65) Prior Publication Data

US 2011/0018479 A1    Jan. 27, 2011

(30) Foreign Application Priority Data

Jul. 21, 2009    (CN) .......................... 2009 1 0304585

(51) Int. Cl.
*H02P 7/29* (2006.01)

(52) U.S. Cl. ......... 388/811; 388/825; 388/828; 318/599

(58) Field of Classification Search .................. 318/599; 388/811, 828, 825
See application file for complete search history.

(56) References Cited

U.S. PATENT DOCUMENTS

| | | | |
|---|---|---|---|
| 7,355,359 B2* | 4/2008 | Kuo | 318/268 |
| 7,495,407 B2* | 2/2009 | Huang et al. | 318/599 |
| 7,501,717 B2* | 3/2009 | Chen | 307/38 |
| 7,541,762 B2* | 6/2009 | Chen et al. | 318/434 |
| 2007/0019383 A1* | 1/2007 | Chang | 361/695 |
| 2007/0081800 A1* | 4/2007 | Hsiang et al. | 388/811 |
| 2007/0108923 A1* | 5/2007 | Chen | 318/66 |
| 2007/0148019 A1* | 6/2007 | Chen | 417/423.1 |
| 2007/0292257 A1* | 12/2007 | Ooi et al. | 415/1 |
| 2008/0095521 A1* | 4/2008 | Chen et al. | 388/829 |
| 2009/0033806 A1* | 2/2009 | Yuasa | 348/734 |
| 2009/0169188 A1* | 7/2009 | Huang et al. | 388/811 |
| 2009/0175602 A1* | 7/2009 | Qian et al. | 388/825 |
| 2009/0208192 A1* | 8/2009 | Xi et al. | 388/819 |

* cited by examiner

*Primary Examiner* — Rita Leykin
(74) *Attorney, Agent, or Firm* — Altis Law Group, Inc.

(57) ABSTRACT

A system can control a rotary speed of a computer fan according to the type of the computer fan. If the computer fan is determined to be a 3-pin fan, the system can output a changeable voltage to control the rotary speed of the 3-pin fan.

8 Claims, 2 Drawing Sheets

SYSTEM FOR CONTROLLING ROTARY SPEED OF COMPUTER FAN

BACKGROUND

1. Technical Field

The present disclosure relates to systems for controlling rotary speeds of computer fans, and particularly to a system for controlling a rotary speed of a computer fan according to a type of the computer fan.

2. Description of Related Art

Generally, a computer system includes a motherboard with various chips such as central processing units (CPUs) mounted thereon, and a storage device such as a hard disk drive, each of which is known to generate heat when operating in the computer system. Typically, a computer fan is mounted on the motherboard to dissipate the heat timely.

Computer fans ordinarily include 3-pin fans and 4-pin fans. Generally, a 3-pin fan is connected to a motherboard by a 3-pin header mounted on the motherboard, and a 3-pin fan controller provides a voltage signal to the 3-pin fan. A 4-pin fan is connected to a motherboard by a 4-pin fan header mounted on the motherboard, a fourth pin of the 4-pin fan header is used to output a pulse-width modulation (PWM) signal, and a 4-pin fan controller is provided to supply the PWM signal to the 4-pin fan for adjusting a rotary speed of the 4-pin fan. However, the 3-pin fan can be connected to the 4-pin header, while a rotary speed of the 3-pin fan cannot be adjusted because the 3-pin fan does not have the fourth pin to receive the PWM signal.

DETAILED DESCRIPTION

Figure 1:
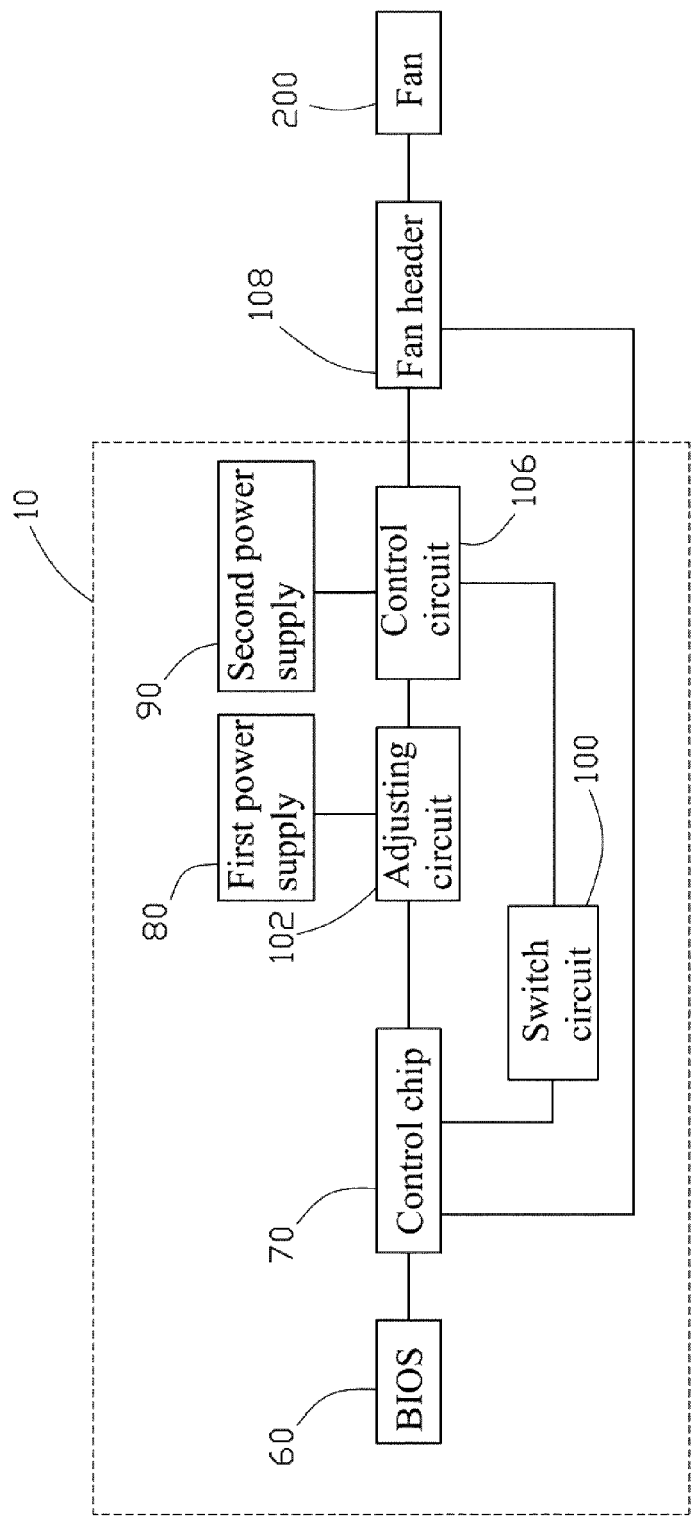
FIG. 1 is a block diagram of an exemplary embodiment of a system for controlling a rotary speed of a computer fan.

Referring to FIG. 1, an exemplary embodiment of a system 10 is used to control a rotary speed of a computer fan 200 connected to a fan header 108, according to a type (e.g., a 3-pin fan or a 4-pin fan) of the computer fan 200. The computer fan 200 is mounted to a chip, such as a central processing unit, to dissipate heat generated by the chip. The system 10 includes a basic input and output system (BIOS) 60, a control chip 70, a first power supply 80, a second power supply 90, a switch circuit 100, an adjusting circuit 102, and a control circuit 106. In one embodiment, the control chip 70 may be a super input/output (I/O) chip, a platform controller hub (PCH), or another kind of device.

The BIOS 60 is connected to the control chip 70, to control the control chip 70 to output a high or low level control signal. The control chip 70 is connected to the adjusting circuit 102, and the fan header 108. The switch circuit 100 is connected between the control chip 70 and the control circuit 106. The adjusting circuit 102 is also connected to the first power supply 80 and the control circuit 106. The control circuit 106 is also connected to the second power supply 90 and the fan header 108.

When the system 10 detects and obtains a type of the fan 200 inserted in the fan header 108, the BIOS 60 controls the control chip 70 to output a corresponding control signal to turn on the switch circuit 100. The first power supply 80 provides a voltage to the adjusting circuit 102. The adjusting circuit 102 rectifies a PWM signal (digital voltage signal) output from the control chip 70 as an analog voltage signal to the control circuit 106. The control circuit 106 controls the second power supply 90 to output a constant driving voltage (e.g., 12V) according to the analog voltage signal, and provides the constant driving voltage to a power terminal of the fan header 108, to provide power for the fan 200. The BIOS 60 controls the control chip 70 to output first and second PWM signals with different duty factors to a control terminal of the fan header 108, compares a difference between first and second rotary speeds of the fan 200 under the first and second PWM signals to determine the type of the fan 200. If a ratio of the first rotary speed to the second rotary speed is substantially equal to a ratio of a duty factor of the first PWM signal to a duty factor of the second PWM signal, the fan 200 is a 4-pin fan. If the ratio of the first rotary speed to the second rotary speed is not substantially equal to the ratio of the duty factor of the first PWM signal to the duty factor of the second PWM signal, the fan 200 is a 3-pin fan. For example, if the first rotary speed of the fan 200 is 3000 revs/sec when the duty factor of the first PWM signal is 100%, and the second rotary speed of the fan 200 is 3100 revs/sec when the duty factor of the second PWM signal is 20%, the fan is a 3-pin fan. If the first rotary speed of the fan is 3000 revs/sec when the duty factor of the first PWM signal is 100%, and the second rotary speed of the fan is 700 revs/sec when the duty factor of the second PWM signal is 20%, the fan 200 is a 4-pin fan.

If the fan 200 is determined to be a 4-pin fan, the switch circuit 100 of the system 10 stays on. The control chip 70 can output a PWM signal with different duty factors according to temperature of the chip to the control terminal of the fan header 108, to change the rotary speed of the fan 200 automatically.

If the fan 200 is determined to be a 3-pin fan, the BIOS 60 controls the control chip 70 to output a control signal to turn off the switch circuit 100. The control chip 70 also outputs a PWM signal whose duty factors change with the temperature of the chip. The adjusting circuit 102 rectifies the PWM signal output from the control chip 70 as an analog voltage signal to the control circuit 106. The control circuit 106 controls the second power supply 90 to output a changeable driving voltage to the power terminal of the fan header 108 to control the rotary speed of the fan 200.

Figure 2:
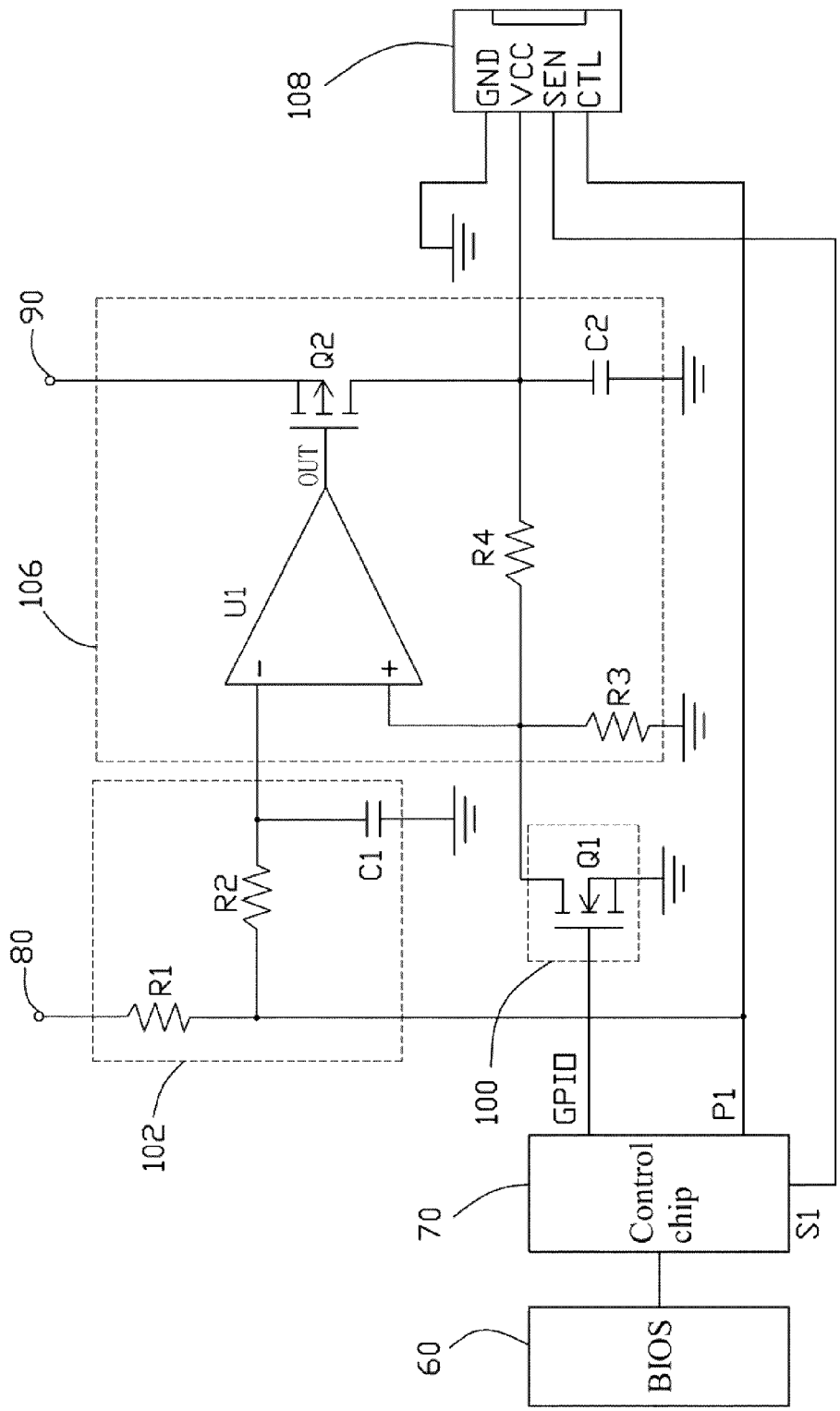
FIG. 2 is a circuit diagram of the system of FIG. 1, in accordance with an embodiment.

Referring to FIG. 2, the switch circuit 100 includes a field effect transistor (FET) Q1. A gate of the FET Q1 is connected to a control signal output terminal GPIO of the control chip 70, a source of the FET Q1 is grounded, and a drain of the FET Q1 is connected to the control circuit 106. In this embodiment, the FET Q1 is an N-channel metal oxide semiconductor (NMOS) FET. In other embodiments, the FET Q1 can also be other types of electronic switches, such as a pnp transistor.

The adjusting circuit 102 includes resistors R1, R2, and a capacitor C1. The resistor R1 is connected between the first power supply 80 and a PWM signal output terminal P1 of the control chip 70. A first terminal of the resistor R2 is connected to a node between the resistor R1 and the PWM signal output terminal P1 of the control chip 70, a second terminal of the resistor R2 is grounded via the capacitor C1, and also connect to the control circuit 106. In this embodiment, the first power supply 80 may be a 5 volt (V) direct current (DC) power supply.

The control circuit 106 includes an amplifier U1, a FET Q2, two resistors R3, R4, and a capacitor C2. An inverting input terminal of the amplifier U1 is connected to a node between the capacitor C1 and the resistor R2. A non-inverting input terminal of the amplifier U1 is grounded via the resistor R3, connected to the drain of the FET Q1, and connected to the power terminal VCC of fan header 108 via the resistor R4. An output terminal OUT of the amplifier U1 is connected to a gate of the FET Q2. A source of the FET Q2 is connected to the second power supply 90. A drain of the FET Q2 is connected to the power terminal VCC of the fan header 108, and grounded via the capacitor C2. A ground terminal GND of the fan header 108 is grounded. The control terminal CTL of the fan header 108 is connected to the PWM signal output terminal P1 of the control chip 70. A sense terminal SEN of the fan header 108 is connected to a detection pin S1 of the control chip 70. In this embodiment, the second power supply 90 may be a 12V DC power supply, and the FET Q2 may be a P-channel metal oxide semiconductor (PMOS) FET. In other embodiments, the FET Q2 may also be other types of electronic switches, such as an npn transistor.

The following depicts how the system 10 detects the type of the fan 200 and controls the rotary speed of the fan according to the type of the fan 200. The BIOS 60 controls the control signal output terminal GPIO of the control chip 70 to output a high level control signal (e.g., 3V) to turn on the FET Q1. The first power supply 80 provides a voltage to the adjusting circuit 102. The adjusting circuit 102 rectifies a PWM signal output from the control chip 70 as an analog voltage signal to the inverting input terminal of the amplifier U1 of the control circuit 106. The output terminal OUT of the amplifier U1 outputs a low level start voltage (e.g., 0V). The FET Q2 is turned on, and the second power supply 90 outputs a constant driving voltage (e.g., 11.8V) to the power terminal VCC of the fan header 108 according to the analog voltage signal. If the rotary speed of the fan 200 inserted in the fan header 108 is 3000 revs/sec when the PWM signal output terminal P1 of the control chip 70 outputs a PWM signal with a high duty factor, such as 100%, and the rotary speed of the fan is 3100 revs/sec when the PWM signal output terminal P1 of the control chip 70 outputs a PWM signal with a low duty factor, such as 20%, the fan 200 is determined to be a 3-pin fan. If the rotary speed of the fan 200 inserted in the fan header 108 is 3000 revs/sec when the PWM signal output terminal P1 of the control chip 70 outputs a PWM signal with a high duty factor, such as 100%, and the rotary speed of the fan 200 is 700 revs/sec when the PWM signal output terminal P1 of the control chip 70 outputs a PWM signal with a low duty factor, such as 20%, the fan is determined to be a 4-pin fan.

If the fan 200 is a 4-pin fan, the BIOS 60 controls the control signal output terminal GPIO of the control chip 70 to keep outputting the high level control signal. The control chip 70 can output the PWM signal with different duty factors to the control terminal CTL of the fan header 108 to change the rotary speed of the fan 200 automatically.

If the fan 200 is a 3-pin fan, the BIOS 60 controls the control signal output terminal GPIO of the control chip 70 to output a low level control signal to turn off the FET Q1. The control chip 70 outputs a PWM signal whose duty factor changes with the temperature of the chip to descend, such as the duty factor changing to 10%, the first power supply 80 provides a voltage to the adjusting circuit 102. The adjusting circuit 102 rectifies the PWM signal output from the control chip 70 as an analog voltage signal (e.g., 1.7V) to the inverting input terminal of the amplifier U1 of the control circuit 106. The output terminal OUT of the amplifier U1 outputs a start voltage, such as 11.2V. The FET Q2 is turned on, with a low voltage difference between the gate and the source of the FET Q2. The second power supply 90 outputs a low driving voltage (e.g., 5.8V) to the power terminal VCC of the fan header 108, the fan 200 runs at a lower speed. When the control chip 70 outputs a PWM signal whose duty factor changes with the temperature of the chip to rise, such as the duty factor changing to 80%, the first power supply 80 provides a voltage to the adjusting circuit 102. The adjusting circuit 102 rectifies the PWM signal output from the control chip 70 as an analog voltage signal (e.g., 10.2V) to the inverting input terminal of the amplifier U1 of the control circuit 106. The output terminal OUT of the amplifier U1 outputs a start voltage, such as 10.1V The FET Q2 is turned on, with a high voltage difference between the gate and the source of the FET Q2. The second power supply 90 outputs a high driving voltage (e.g., 11.3V) to the power terminal VCC of the fan header 108, the fan 200 runs at a higher speed.

It is to be understood, however, that even though numerous characteristics and advantages of the embodiments have been set forth in the foregoing description, together with details of the structure and function of the embodiments, the disclosure is illustrative only, and changes may be made in details, especially in matters of shape, size, and arrangement of parts within the principles of the embodiments to the full extent indicated by the broad general meaning of the terms in which the appended claims are expressed.

What is claimed is:

1. A system for controlling a rotary speed of a computer fan connected to a fan header, the system comprising:
    a basic input and output system (BIOS);
    a first and a second power supplies;
    a control circuit connected to the second power supply and the fan header;
    an adjusting circuit connected to the first power supply and the control circuit;
    a control chip connected to the adjusting circuit, the BIOS, and the fan header; and
    a switch circuit connected between the control chip and the control circuit;
    wherein the BIOS controls the control chip to output a first control signal to turn on the switch circuit, the first power supply provides a first voltage to the adjusting circuit, the adjusting circuit rectifies a first pulse-width modulation (PWM) signal output from the control chip as a first analog voltage signal to the control circuit, the control circuit controls the second power supply to output a constant driving voltage according to the first analog voltage signal, and provides the constant driving voltage to a power terminal of the fan header, the BIOS controls the control chip to output second and third PWM signals with different duty factors to a control terminal of the fan header, the BIOS also measures second and third rotary speeds of the fan under the second and third PWM signals, wherein the fan is a 4-pin fan in response to a ratio of the second rotary speed to the third rotary speed being substantially equal to a ratio of a duty factor of the second PWM signal to a duty factor of the third PWM signal, wherein the fan is a 3-pin fan in response to the ratio of the second rotary speed to the third rotary speed being not substantially equal to the ratio of the duty factor of the second PWM signal to the duty factor of the third PWM signal; and
    wherein the BIOS controls the control chip to output a second control signal to turn off the switch circuit in response to the fan being a 3-pin fan, the control chip outputs the PWM signal whose duty factor changes with temperature to make the first power supply provide a second voltage to the adjusting circuit, the adjusting circuit rectifies the PWM signal output from the control chip as analog voltage signals to the control circuit, and the control circuit controls the second power supply to output a changeable driving voltage to the power terminal of the fan header to control the rotary speed of the fan.

2. The system of claim 1, wherein the switch circuit comprises a field effect transistor (FET), a gate of the FET is connected to the control chip, a source of the FET is grounded, and a drain of the FET is connected to the control circuit.

3. The system of claim 1, wherein the adjusting circuit comprises a first and a second resistors, and a capacitor, the first resistor is connected between the first power supply and a PWM signal output terminal of the control chip, a first terminal of the second resistor is connected to a node between the first resistor and the PWM signal output terminal of the control chip, a second terminal of the second resistor is grounded via the capacitor, and also connect to the control circuit.

4. The system of claim 1, wherein the control circuit comprises an amplifier, an electronic switch, and first and second resistors, an inverting input terminal of the amplifier is connected to the adjusting circuit, a non-inverting input terminal of the amplifier is grounded via the first resistor, connected to the switch circuit, and connected to the power terminal of the fan header via the second resistor, an output terminal of the amplifier is connected to a first terminal of the electronic switch, a second terminal of the electronic switch is connected to the second power supply, a third terminal of the electronic switch is connected to the power terminal of the fan header, the control terminal of the fan header is connected to a PWM signal output terminal of the control chip, and a sense terminal of the fan header is connected to the control chip, wherein when the control chip outputs the PWM signal whose duty factor changes with temperature to rise, the switch circuit is turned on, with a high voltage difference between the first and second terminals of the electronic switch, the second power supply outputs a high driving voltage to the power terminal of the fan header, and the fan runs at a higher speed, when the control chip outputs the PWM signal whose duty factor changes with temperature to descend, the switch circuit is turned on, with a low voltage difference between the first and second terminals of the electronic switch, the second power supply outputs a low driving voltage to the power terminal of the fan header, and the fan runs at a lower speed.

5. The system of claim 4, wherein the control circuit further comprises a capacitor, the capacitor is connected between the power terminal of the fan header and the ground.

6. The system of claim 4, wherein the electronic switch is a field effect transistor (FET), the first, second and third terminals of the electronic switch are a gate, a source, and a drain of the FET respectively.

7. The system of claim 1, wherein the control chip is a super input/output (I/O) chip.

8. The system of claim 1, wherein the control chip is a platform controller hub.

* * * * *